United States Patent [19]

Nakatsukasa et al.

[11] Patent Number: 5,614,029
[45] Date of Patent: Mar. 25, 1997

[54] FURNACE FOR TREATING ORGANIC MATTER HEAT

[75] Inventors: Eiji Nakatsukasa; Masao Takeda; Ippei Yamauchi, all of Kyoto, Japan

[73] Assignee: Shimadzu Mectem, Inc., Shiga-ken, Japan

[21] Appl. No.: 443,028

[22] Filed: May 17, 1995

[30] Foreign Application Priority Data

May 20, 1994 [JP] Japan .................................. 6-107066

[51] Int. Cl.⁶ .............................. B08B 7/04; B01D 1/00
[52] U.S. Cl. .................... 134/5; 134/19; 134/21; 219/462; 159/31; 202/205; 203/91
[58] Field of Search ........................ 134/5, 19, 21, 134/105, 107; 159/31; 203/91; 202/205; 165/61; 219/462, 430; 373/8, 9, 80

[56] References Cited

U.S. PATENT DOCUMENTS

| | | | |
|---|---|---|---|
| 3,346,417 | 10/1967 | Ehrlich | 134/19 X |
| 4,141,373 | 2/1979 | Kartanson et al. | 134/105 X |
| 4,220,480 | 9/1980 | Dwan | 134/5 |
| 4,415,360 | 11/1983 | Leirnes | 134/5 X |
| 5,228,514 | 7/1993 | Worden et al. | 165/61 X |
| 5,370,143 | 12/1994 | Takahashi | 134/105 |
| 5,401,321 | 3/1995 | Hugo et al. | 134/21 |

Primary Examiner—Jill Warden
Assistant Examiner—Saeed Chaudhry
Attorney, Agent, or Firm—Banner & Witcoff, Ltd.

[57] ABSTRACT

A method and apparatus to minimize contamination in a furnace comprising placing a case to accommodate material to be heat treated in the furnace, forming a gas flow into the case from inside of the furnace, heating the work maintained in the case to evaporate organic matters contained in the work, evacuating the vapor containing the organic matter to the outside of the furnace through an internal evacuation duct provided through the furnace, liquefying the vapor containing the organic matters under reduced pressure by introducing same into a liquefying trap and thereafter continuously collecting these liquefied organic matters.

3 Claims, 1 Drawing Sheet

FURNACE FOR TREATING ORGANIC MATTER HEAT

FIELD OF THE ART

This invention relates to a heat treatment device, and particularly to a heat treatment furnace for powder like carbon powder, press or injection molded articles of metal or ceramic, or parts to which process oil adheres, and which may be a batch or a continuous type.

BACKGROUND OF THE INVENTION

Many works to which heat treatment is applied contain organic matters, for example, tar or pitch contained in carbon powder, binder used for powder metallurgy, or process oil which attaches to a machine processed article. Conventionally, the organic matters contained in the above-mentioned works has been removed during a heat-up process in an atmosphere furnace or a vacuum furnace. A trap has been to trap vapor with the vapor coagulated by means of its cooling surface.

However, when a work is heated in an ordinary atmosphere furnace, organic matters evaporate from the work and attaches to the inside of the furnace, thereby to cause some problems such as deteriorating the material of the furnace, short-circuiting electrodes, or complicating cleaning or maintenance. As a further problem, if organic matters have adhered to the material of the furnace as mentioned above, when next time heat treatment is conducted in the same furnace, the organic matters evaporate and may be impregnated into the work, thereby to cause a trouble of deteriorating the quality of the products. In addition, if the furnace evacuates simply through the evacuation duct, a lot of organic vapors contained in the exhaust gas may stop up the trap, or halt or break down the pump because the organic matters go into the pump and coagulate there. Further, the organic matters which are evacuated out of the furnace pollute the environment.

It is an object of the present invention to provide a heat treatment device which is clean in every aspect and which makes it possible to remove the organic matters out of the work appropriately and to heat treat the work as well as to facilitate the maintenance.

SUMMARY OF THE INVENTION

To accomplish the above-mentioned object the invention has adopted the following structure. A heat treatment device in accordance with the invention comprises a furnace inside of which a heater is provided, a case arranged within an area where heat from the heater reaches in the furnace, an internal evacuation duct introduced into the case, a gas furnishing duct introduced into the furnace, and a liquefying trap having a tank and a clearance formed between a cooling surface and a heating surface and which is arranged in the internal evacuation duct, and is characterized by that a work containing organic matters is arranged in the case and heated up to evaporate the organic matters contained therein, that the vapor containing organic matters is introduced into the outside of the furnace through the internal evacuation duct and liquefied by the liquefying trap under the reduced pressure, and that the liquefied organic matters are continuously collected in the tank.

In accordance with the invention, if gas is introduced into a furnace through a gas furnishing duct and inside the case is evacuated through an internal evacuation duct, the gas which once has flowed into the furnace then flows out into the case at which the pressure is relatively lower than the furnace, and the gas is evacuated out of the furnace through the internal evacuation duct. As the work arranged in the case is heated up, organic matters evaporate from the work and the vapor containing organic matters is introduced into the internal evacuation duct and then condensed under the reduced pressure in a liquefying trap arranged in the internal evacuation duct and flows into the tank in a fluid state.

In accordance with the invention, as the area at which the evaporated organic matters volatilize and diffuse is limited to the space formed in the box, the evaporated organic matters do not get into the furnace, thereby to protect inside the furnace from pollution effectively and to facilitate maintenance, resulting in keeping a clean processing atmosphere, and improving the quality of the work. As the liquefying trap is arranged in the evacuation duct, the vapor which has been evacuated out of the furnace condenses under the reduced pressure in the liquefying trap effectively and flows into the tank in a fluid state, thereby to be trapped by the tank. Therefore, the efficiency of the trap does not drop even though the device is continuously operated, thereby to require no maintenance. In addition, no pollutant, that is no organic matter, is emitted into the atmosphere, thereby contributing to the environmental protection.

DETAILED DESCRIPTION OF PREFERRED EMBODIMENT

Figure 1:
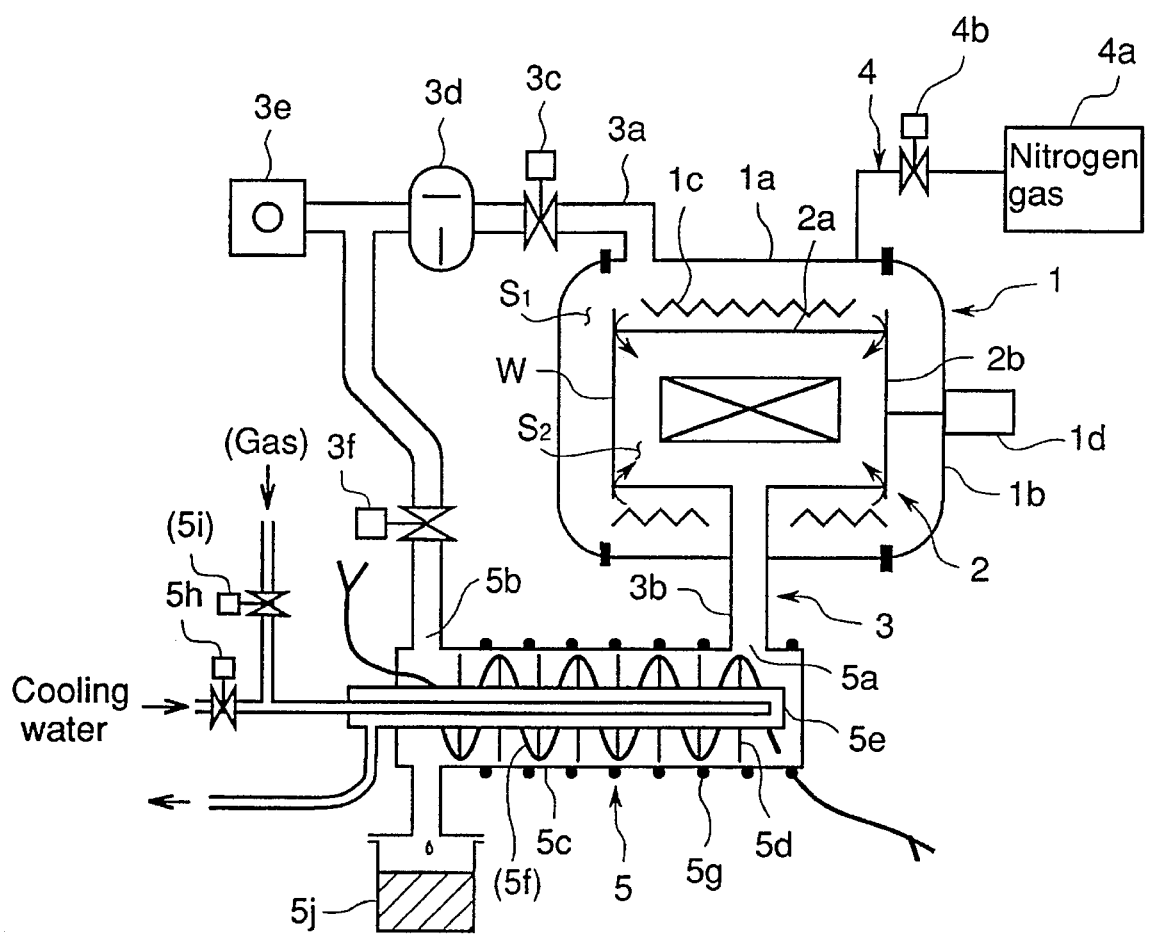
FIG. 1 is a schematic view of a preferred embodiment of this invention.

An embodiment of the invention will now be described below with reference to a figure.

Although it is admitted that carbon powder is useful, if used as electrodes for a recent topical lithium ion battery, the raw material of the carbon powder contains organic matters such as tar, pitch or the like. In order to utilize the carbon powder as the material for electrodes, the carbon powder should be heat treated after removing organic matters such as tar or the like.

The heat treatment device for the carbon powder in accordance with the embodiment comprises, a furnace 1, a box 2, an evacuation duct 3, a gas furnishing duct 4, and a liquefying trap 5 which has a clearance formed between a cooling surface and a heating surface.

The furnace 1 has a structure which can seal the inside thereof airtightly with a door 1b openable to the body 1a provided at least one end thereof. Inside the furnace 1 a heater 1c having a thermal capability of providing a powder W as a work with heat treatment, for example, at a temperature of 1300 degrees centigrade. The box 2 is arranged within an area heated by the heater 1c. The box 2 is made of graphite and comprises a body 2a and a cap 2b which is openable to the body 2a by means of a cylinder 1d attached to the door 1b of the above-mentioned furnace 1.

The evacuation duct 3 comprises a main evacuation duct 3a connected to a space S1 formed in the furnace 1 and an internal evacuation duct 3b connected to a space S2 formed in the box 2. The main evacuation duct connects the space S1 in line with a mechanical booster pump 3d and an oil rotary vacuum pump 3e through a valve 3c. The internal evacuation duct 3b connects the space S2 in parallel with an inlet of the above-mentioned oil rotary vacuum pump 3e by a liquefying trap 5 and a valve 3f.

The gas furnishing duct 4 has a gas furnishing source 4a filled with nitrogen gas as gas and a valve 4b, and introduces the nitrogen gas from the gas furnishing source 4a into the space S1 through the furnace 1.

The liquefying trap 5 comprises a case 5c extending along the axial direction and having an inlet 5a at one of the ends thereof and an outlet 5b at the other end thereof, a cooling pipe 5e inserted into the case 5c through the one end of the axis of the case 5c with a plurality of disc-shaped fins 5d arranged spaced apart along the axial direction thereof and a sheathed heater 5g surrounding around the case 5c. The sheathed heater 5g is provided with a heating capability of fusing tar or the like, for example, at a temperature of about 100 degrees centigrade. The cooling pipe 5e has a double construction of an inner pipe and an outer pipe. The cooling water transported through the inner pipe to near the front end of the case 5c passes through the clearance between the inner pipe and the outer pipe and is collected at the rear end of the case 5c. And the cooling water is removed by introducing pressurizing gas into the cooling pipe 5e by means of a change-over valve 5h or 5i, if necessary. As each of the fins 5d is so arranged that a clearance is formed between the periphery of each fin 5d and the case 5c, adiabatic expansion is caused when vapor passes through the clearance under the reduced pressure by the effect of squeezing. To be concrete, the outer diameter of the fin 5 corresponds generally to the inner diameter of the case 5c, and each of the fins 5d is recessed from the internal wall of the case 5c with the periphery thereof folded at several points. The clearance may formed around the periphery thereof.

Next, the process of the heat treatment in accordance with the embodiment will now be explained. First, put the powder W containing tar or the like into the box 2, and close the door 1b of the furnace 1 and the cap 2b of the box 2. The powder W may be treated to be put in a tray, and the tray can be arranged to stack in a plurality of shelves. Then conduct vacuum evacuation in the furnace 1 by actuating the main evacuation duct 3a. Since the box 2 is breathable because of the clearance formed between the body 2a and the cap 2b, the space S2 in the box 2 is evacuated if the space S1 in the furnace 1 is evacuated. After these spaces S1 and S2 are substituted by vacuum, close the valve 3c and open the valve 3f to actuate the internal evacuation duct 3b. Then turn on the heater 1c, and open the valve 4b to introduce nitrogen gas into the space S1 in the furnace 1 through a gas introducing pass 4. The nitrogen gas which once has been introduced into the space S1 in the furnace 1 flows into the space S2 in the box 2 through the clearance formed in the box 2 and is absorbed by the internal evacuation duct 3b, thereby to form a flow from the inside of the box 2 directly to the outside of the furnace 1. On the other hand, as the powder W in the space S2 of the box 2 is raised in temperature by being gradually heated up by the heater 1c, tar or pitch content begins to evaporate from the powder W at an effective speed. The organic vapor evaporated from the powder W flows into the internal evacuation duct 3b together with the above-mentioned gas and then flows into the liquefying trap 5 of the next process. A channel having alternate big and small cross section is formed in the liquefying trap 5 by the fins 5d and the case 5c. Vapor is cooled by the fins 5d when contacting therewith as the fins 5d are cooled by the cooling pipe 5e and self-cooled by the effect of the adiabatic expansion when passing through the narrow clearance between the fin 5d and the case 5c. Tar content effectively condenses under the reduced pressure and attaches to fins 5d or the inner wall of the case 5c. As the wall of the case 5c is constantly heated by the sheathed heater 5g, tar or the like which has attached to the fins 5d or the case 5c is liquefied and drops on the base wall of the case 5c, then flows into the tank 5j arranged under the case 5c, and finally hardens in the tank 5j. When the temperature heated by the heater 1c reaches several hundreds degrees centigrade, the evaporation of the tar content generally finishes. And then close the valve 4b, halt gas furnishing, open the cap 2b of the box 2 by means of the cylinder 1d to evacuate gas through the main evacuation duct 3a, raise the temperature of the heater to approximate 1200 degrees centigrade, maintain the above-mentioned temperature, and then conduct the heat treatment.

For removing residual tar or the like at maintenance which has coagulated in the cooling pipe 5e while the above-mentioned process, first close the valve 5h after the heat treatment, then open the valve 5i to remove the cooling water from the cooling pipe 5e by means of high-pressure gas, and fuse and collect the tar or the like by conducting electricity not only the sheathed heater 5g but also the sheathed heater 5f which attaches to the cooling pipe 5e.

The tar or the like which has hardened in the tank 5j can easily be removed by dismounting the base wall of the tank 5j after every treatment is finished and the work W to which the treatment has been provided is taken out.

In accordance with the invention the area at which evaporated tar or the like volatilizes and diffuses is limited to the space S2 formed in the box 2 and does not leak out to the space S1 formed in the furnace 1. Therefore, the wall or the heat insulating material of the furnace 1 can effectively be protected from pollution, thereby to make cleaning or maintenance easier and to improve the purity of the carbon powder W because the space S2 in the box 2 is kept to be a clean heat treatment atmosphere when heat treatment is provided. As the liquefying trap 5 is arranged within the internal evacuation duct 3b and the gas containing tar or the like evacuated from the furnace 1 is cooled by introducing the gas into the liquefying trap 5 under the reduced pressure, tar content or the like can effectively be liquefied and the liquefied tar or the like is instantly collected in the tank 5j, resulting in not deteriorating trap efficiency, omitting the necessity of the maintenance because of no intrusion into the vacuum pump, and contributing to the environmental protection because of the prevention from emitting pollutant to the atmosphere even though the device is continuously operated.

The invention is not limited to the above-mentioned embodiments, but there may be various modifications without departing from the spirit or essential characteristics thereof such as: The work W is explained to be carbon powder in the above embodiment, but may be a sintering product in the powder metallurgy or heat treatment of parts to which process oil attaches can be applied which is to be thermally treated. The furnace which has been used in the above embodiment is a batch type, but may be a continuous furnace. Nitrogen gas has been used as the furnishing gas in the above embodiment, but it may be replaced with hydrogen gas or other gasses. The outlet of the liquefying trap may be connected to upstream from the mechanical booster pump in order to accelerate the evacuation speed of the internal evacuation duct. In addition, a cooling fan or a diffusion pump may be added for rapid cooling or higher vacuum evacuation. And the gas may be introduced intermittently. The valve 5i and the heater 5f are for maintenance and can be omitted. A valve may be added upstream from the internal evacuation duct 3b or of the liquefying trap 5j, if necessary. The liquefying trap 5j may be arranged downstream from the internal evacuation duct 3b. A sheathed heater 5f may surround around the cooling pipe 5e.

In accordance with the invention, the heat treatment device is preferably used as a heat treatment furnace for powder like carbon powder, press or injection molded articles of metal or ceramic, or parts to which process oil adheres, and which may be a batch or a continuous type.

What is claimed is:

1. A heat treatment device for work containing organic matter comprising:

a furnace inside of which a heater is provided;

a case arranged in the furnace within an area where heat from said heater reaches said case;

an internal evacuation duct interconnected between said case and outside of said furnace;

a gas furnishing duct to introduce gas into said furnace; and a liquefying trap having a tank arranged m said internal evacuation duct;

wherein said liquefying trap has a clearance formed between a cooling surface and a heating surface for continuous flow of gas within said clearance.

2. The heat treatment device as defined in claim 1, wherein said heating surface constitutes a base wall of the liquefying trap.

3. A method of heat treating work containing organic matter comprising:

heating said work in a case inside a furnace to vaporize said organic matter, said furnace including a heater, said case being arranged within an area of said furnace where heat from said heater reaches said case and, further, said furnace including an internal evacuation duct interconnecting said case through said furnace to outside thereof, and a gas furnishing duct to introduce gas into said furnace;

passing said vaporized organic matter through a liquefying trap having a tank which is arranged in said internal evacuation duct; and liquefying the vaporized organic matter in the liquefying trap under reduced pressure and thereafter continuously collecting the liquefied organic matter in the tank;

wherein said liquefying trap has a clearance formed between a cooling surface and a heating surface.

* * * * *